US011068837B2

(12) United States Patent
Murray et al.

(10) Patent No.: US 11,068,837 B2
(45) Date of Patent: Jul. 20, 2021

(54) SYSTEM AND METHOD OF SECURELY SENDING AND RECEIVING PACKAGES VIA DRONES

(71) Applicant: International Business Machines Corporation, Armonk, NY (US)

(72) Inventors: Brian J. Murray, Tampa, FL (US); Todd Latimer Ransom, Asheville, NC (US); DeWane Cecil Stone, Decatur, GA (US); Kaleb Dean Walton, Fenton, MI (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 15/357,821

(22) Filed: Nov. 21, 2016

(65) Prior Publication Data

US 2018/0144302 A1     May 24, 2018

(51) Int. Cl.
*G06Q 10/08*     (2012.01)
*G06K 9/00*     (2006.01)
(Continued)

(52) U.S. Cl.
CPC ..... *G06Q 10/08355* (2013.01); *B64C 39/024* (2013.01); *G06K 9/00288* (2013.01); *G06K 9/00885* (2013.01); *G07C 9/37* (2020.01); *B64C 2201/127* (2013.01); *B64C 2201/128* (2013.01); *B64C 2201/145* (2013.01); *G07C 2009/0092* (2013.01)

(58) Field of Classification Search
CPC ............... G06Q 10/08355; G07C 9/37; G07C 2009/0092; B64C 39/024; B64C 2201/127; B64C 2201/128; B64C 2201/145; G06K 9/00288; G06K 9/00885
See application file for complete search history.

(56) References Cited

U.S. PATENT DOCUMENTS 5,212,649 A * 5/1993 Pelletier ................. G06Q 10/08
                                                    221/120
5,385,265 A * 1/1995 Schlamp .................. G07F 7/00
                                                    221/131

(Continued)

OTHER PUBLICATIONS

Jozsef Mezei, "Drone Sound Detection", published by CINTI 2015 in 2015 (Year: 2015).*

(Continued)

*Primary Examiner* — Omar Zeroual
(74) *Attorney, Agent, or Firm* — Daniel R. Simek

(57) ABSTRACT

An autonomous vehicle comprising a transport body configured to travel to an identified location, a package retention device for securing one or more packages to the transport body; one or more processors integral to the transport body, wherein the processors are configured by code executing therein to: access shipper and recipient profile data; wherein the shipper and recipient profile data includes location data for shipper and recipient; navigate the autonomous vehicle to a shipping destination and a delivery destination; provide access to the package retention device upon authentication of a shipper presenting a package at a shipping destination, and provide access to the package retention device upon authentication of a recipient retrieving a package at the delivery destination.

17 Claims, 5 Drawing Sheets

(51) Int. Cl.
*B64C 39/02* (2006.01)
*G07C 9/37* (2020.01)
*G07C 9/00* (2020.01)

(56) References Cited

U.S. PATENT DOCUMENTS

| | | | | |
|---|---|---|---|---|
| 6,690,997 | B2* | 2/2004 | Rivalto | G06Q 10/08 700/237 |
| 7,086,198 | B2* | 8/2006 | Hayden | G07F 11/54 47/41.01 |
| 7,857,161 | B2* | 12/2010 | Pinney | G07F 17/0092 221/10 |
| 7,925,375 | B2* | 4/2011 | Schininger | G07F 11/007 700/214 |
| 8,145,351 | B2* | 3/2012 | Schininger | G07F 17/12 700/237 |
| 9,056,676 | B1* | 6/2015 | Wang | B60R 9/00 |
| 9,106,679 | B2* | 8/2015 | Ho | H04L 63/126 |
| 9,135,403 | B1* | 9/2015 | Tolmosoff | G07F 17/0092 |
| 9,244,147 | B1* | 1/2016 | Soundararajan | G06Q 10/0833 |
| 9,305,155 | B1* | 4/2016 | Vo | G06F 21/32 |
| 9,359,074 | B2 | 6/2016 | Ganesh et al. | |
| 9,387,928 | B1* | 7/2016 | Gentry | G08G 5/0052 |
| 9,412,278 | B1* | 8/2016 | Gong | G08G 5/0091 |
| 9,545,995 | B1* | 1/2017 | Chau | B64C 39/024 |
| 9,550,577 | B1* | 1/2017 | Beckman | B64C 27/08 |
| 9,619,776 | B1* | 4/2017 | Ford | B64C 39/024 |
| 9,646,597 | B1* | 5/2017 | Beckman | G10K 11/1783 |
| 9,659,502 | B1* | 5/2017 | Abebe | G08G 5/0034 |
| 9,741,255 | B1* | 8/2017 | Navot | G08G 5/0078 |
| 9,783,297 | B2* | 10/2017 | Patrick | B64D 1/22 |
| 9,805,605 | B2* | 10/2017 | Ramanujam | G06Q 10/06 |
| 9,842,120 | B1* | 12/2017 | Siris | G06F 16/29 |
| 9,984,579 | B1* | 5/2018 | Harris | H04W 4/021 |
| 10,022,614 | B1* | 7/2018 | Tran | G16H 50/70 |
| 10,176,447 | B2* | 1/2019 | Borley | G06Q 10/08355 |
| 10,176,792 | B1* | 1/2019 | Elzinga | G10K 11/17821 |
| 10,181,152 | B1* | 1/2019 | Rao | G06Q 20/3224 |
| 10,379,537 | B1* | 8/2019 | Arden | G01C 21/362 |
| 2001/0034665 | A1* | 10/2001 | Kinory | G06Q 30/0601 705/26.1 |
| 2002/0035515 | A1* | 3/2002 | Moreno | G07F 9/105 340/5.73 |
| 2004/0259545 | A1* | 12/2004 | Morita | G08G 1/005 455/435.1 |
| 2005/0038758 | A1* | 2/2005 | Hilbush | G06Q 10/06311 705/402 |
| 2006/0145837 | A1* | 7/2006 | Horton | G08G 1/202 340/539.13 |
| 2007/0005452 | A1* | 1/2007 | Klingenberg | G06Q 10/0835 705/334 |
| 2008/0078707 | A1* | 4/2008 | Wattawa | B07C 7/00 209/630 |
| 2009/0240597 | A1* | 9/2009 | Oswald | G06Q 20/12 705/26.1 |
| 2009/0254448 | A1* | 10/2009 | Giobbi | G06Q 30/0601 705/26.1 |
| 2011/0238300 | A1* | 9/2011 | Schenken | G06Q 10/08 701/408 |
| 2012/0114199 | A1* | 5/2012 | Panyam | G06K 9/00288 382/118 |
| 2012/0143482 | A1* | 6/2012 | Goossen | G08G 5/0034 701/120 |
| 2012/0246039 | A1* | 9/2012 | Fain | G06Q 40/125 705/32 |
| 2012/0253548 | A1* | 10/2012 | Davidson | G06Q 10/0631 701/1 |
| 2012/0254058 | A1* | 10/2012 | Walker | G06Q 10/08 705/333 |
| 2013/0103606 | A1* | 4/2013 | Holliday | G06Q 10/0833 705/333 |
| 2013/0240673 | A1* | 9/2013 | Schlosser | B64D 1/02 244/137.1 |
| 2014/0014008 | A1* | 1/2014 | Tompkins | E05G 1/02 109/23 |
| 2014/0032034 | A1* | 1/2014 | Raptopoulos | G05D 1/0088 701/25 |
| 2014/0180914 | A1* | 6/2014 | Abhyanker | G05D 1/102 705/39 |
| 2014/0254896 | A1* | 9/2014 | Zhou | G06Q 20/3829 382/124 |
| 2014/0330729 | A1* | 11/2014 | Colangelo | G06Q 20/40145 705/72 |
| 2015/0006005 | A1* | 1/2015 | Yu | G06Q 50/28 701/22 |
| 2015/0066606 | A1* | 3/2015 | Smirin | G06Q 10/02 705/13 |
| 2015/0106294 | A1* | 4/2015 | Robinson | G06Q 10/0836 705/339 |
| 2015/0120094 | A1* | 4/2015 | Kimchi | G05D 1/00 701/3 |
| 2015/0145643 | A1 | 5/2015 | Fadell et al. | |
| 2015/0158599 | A1* | 6/2015 | Sisko | B64F 1/20 244/114 R |
| 2015/0175276 | A1* | 6/2015 | Koster | B64C 39/024 244/114 R |
| 2015/0183528 | A1* | 7/2015 | Walsh | A47G 29/141 701/3 |
| 2015/0277440 | A1* | 10/2015 | Kimchi | G08G 5/0013 701/26 |
| 2015/0294262 | A1* | 10/2015 | Nelson | G06Q 10/083 705/330 |
| 2015/0323930 | A1* | 11/2015 | Downey | G08G 5/0026 701/2 |
| 2015/0332206 | A1* | 11/2015 | Trew | G06Q 10/083 705/330 |
| 2015/0336667 | A1* | 11/2015 | Srivastava | B64C 39/024 701/2 |
| 2015/0339923 | A1* | 11/2015 | Konig | H04L 67/12 701/522 |
| 2015/0370251 | A1* | 12/2015 | Siegel | G05D 1/00 701/2 |
| 2016/0012408 | A1* | 1/2016 | Stanoszek | H04W 12/06 705/21 |
| 2016/0033966 | A1* | 2/2016 | Farris | A47G 29/141 701/15 |
| 2016/0068264 | A1* | 3/2016 | Ganesh | B64C 39/024 701/2 |
| 2016/0092880 | A1* | 3/2016 | Klingen | G06Q 20/027 705/16 |
| 2016/0098730 | A1* | 4/2016 | Feeney | G06Q 20/3825 705/71 |
| 2016/0142416 | A1* | 5/2016 | Smith | H04L 63/10 726/9 |
| 2016/0171574 | A1* | 6/2016 | Paulucci | G01C 21/3697 705/13 |
| 2016/0180323 | A1* | 6/2016 | Gupta | G06Q 20/425 705/72 |
| 2016/0180719 | A1* | 6/2016 | Wouhaybi | G08G 5/0069 701/4 |
| 2016/0185466 | A1* | 6/2016 | Dreano, Jr. | G06Q 30/0635 705/26.81 |
| 2016/0189101 | A1* | 6/2016 | Kantor | G08G 5/0026 705/338 |
| 2016/0195602 | A1* | 7/2016 | Meadow | G01S 5/10 701/517 |
| 2016/0196755 | A1* | 7/2016 | Navot | G08G 5/0086 701/4 |
| 2016/0196756 | A1* | 7/2016 | Prakash | G08G 5/025 701/3 |
| 2016/0224776 | A1* | 8/2016 | Leow | G06F 21/32 |
| 2016/0235236 | A1* | 8/2016 | Byers | A47G 29/141 |
| 2016/0253848 | A1* | 9/2016 | Taniguchi | G07B 15/02 705/13 |
| 2016/0253905 | A1* | 9/2016 | Sawato | G08G 1/163 340/902 |
| 2016/0253907 | A1* | 9/2016 | Taveira | G07B 15/00 701/3 |
| 2016/0257401 | A1* | 9/2016 | Buchmueller | G01C 21/343 |

(56) References Cited

U.S. PATENT DOCUMENTS

| | | | |
|---|---|---|---|
| 2016/0300187 A1* | 10/2016 | Kashi | G06Q 10/0836 |
| 2016/0307449 A1* | 10/2016 | Gordon | G06Q 30/0635 |
| 2016/0316322 A1* | 10/2016 | Gillen | G06Q 10/0833 |
| 2016/0327956 A1* | 11/2016 | Zhang | G05D 1/106 |
| 2016/0328678 A1* | 11/2016 | Gillen | G06Q 10/0838 |
| 2016/0340006 A1* | 11/2016 | Tang | B64C 39/024 |
| 2016/0358432 A1* | 12/2016 | Branscomb | G08B 13/1965 |
| 2016/0359986 A1* | 12/2016 | Jones | H04L 67/2814 |
| 2016/0376031 A1* | 12/2016 | Michalski | G05D 1/0669 701/15 |
| 2017/0011333 A1* | 1/2017 | Greiner | G06Q 10/083 |
| 2017/0011339 A1* | 1/2017 | Buford | G06Q 10/0835 |
| 2017/0012920 A1* | 1/2017 | Chheda | G06Q 10/02 |
| 2017/0015415 A1* | 1/2017 | Chan | B60L 53/126 |
| 2017/0031369 A1* | 2/2017 | Liu | B64D 47/08 |
| 2017/0045894 A1* | 2/2017 | Canoy | G08G 5/0013 |
| 2017/0083860 A1* | 3/2017 | Sriram | H04L 63/0823 |
| 2017/0083862 A1* | 3/2017 | Loubriel | G06Q 10/0835 |
| 2017/0090484 A1* | 3/2017 | Obaidi | B64D 47/08 |
| 2017/0091856 A1* | 3/2017 | Canberk | G06Q 30/0609 |
| 2017/0092109 A1* | 3/2017 | Trundle | B60L 53/305 |
| 2017/0116558 A1* | 4/2017 | Pierz | B64C 39/024 |
| 2017/0124789 A1* | 5/2017 | Rephlo | G06Q 10/083 |
| 2017/0127652 A1* | 5/2017 | Shen | G06K 9/0063 |
| 2017/0140174 A1* | 5/2017 | Lacey | G06F 21/6245 |
| 2017/0147976 A1* | 5/2017 | Koch | G06Q 10/0836 |
| 2017/0148328 A1* | 5/2017 | Chan | G08G 5/006 |
| 2017/0148467 A1* | 5/2017 | Franklin | G10L 25/39 |
| 2017/0154304 A1* | 6/2017 | Aryeetey | H04L 9/14 |
| 2017/0160735 A1* | 6/2017 | Mikan | G08G 5/0034 |
| 2017/0161820 A1* | 6/2017 | Friedman | G06Q 20/36 |
| 2017/0174343 A1* | 6/2017 | Erickson | A61B 5/4815 |
| 2017/0177925 A1* | 6/2017 | Volkart | B64C 39/024 |
| 2017/0178269 A1* | 6/2017 | McKinnon | G06Q 50/30 |
| 2017/0201518 A1* | 7/2017 | Holmqvist | G06F 21/34 |
| 2017/0203857 A1* | 7/2017 | O'Toole | A47G 29/141 |
| 2017/0220979 A1* | 8/2017 | Vaananen | G06Q 10/083 |
| 2017/0228690 A1* | 8/2017 | Kohli | G06Q 10/0832 |
| 2017/0234724 A1* | 8/2017 | Naguib | G01H 3/08 367/117 |
| 2017/0255896 A1 | 9/2017 | Van Dyke | A47G 29/141 |
| 2017/0267347 A1* | 9/2017 | Rinaldi | B64D 17/80 |
| 2017/0278094 A1* | 9/2017 | Mackie | G06Q 20/3278 |
| 2017/0278404 A1* | 9/2017 | Gordon | G08G 5/0069 |
| 2017/0286892 A1* | 10/2017 | Studnicka | G06Q 20/204 |
| 2017/0293991 A1* | 10/2017 | High | G06K 9/00771 |
| 2017/0294126 A1* | 10/2017 | Russell, Jr. | H04R 1/028 |
| 2017/0308850 A1* | 10/2017 | Roush | G06Q 10/08355 |
| 2017/0328391 A1* | 11/2017 | Matsuda | B64C 39/024 |
| 2017/0349376 A1* | 12/2017 | Porat | B25J 9/1679 |
| 2018/0016005 A1* | 1/2018 | Srivastava | G05D 1/106 |
| 2018/0037322 A1* | 2/2018 | Buchmueller | B64C 39/024 |
| 2018/0053147 A1* | 2/2018 | Zhang | G06Q 10/0832 |
| 2018/0060811 A1* | 3/2018 | Boesen | G01S 3/46 |
| 2018/0069650 A1* | 3/2018 | Tran | G01S 5/0215 |
| 2018/0074494 A1* | 3/2018 | Myers | G06K 9/00288 |
| 2018/0075565 A1* | 3/2018 | Myers | G06Q 30/02 |
| 2018/0082343 A1* | 3/2018 | Gordon | G01C 21/3407 |
| 2018/0082682 A1* | 3/2018 | Erickson | B64C 39/024 |
| 2018/0086452 A1* | 3/2018 | Hunt | G06Q 10/0835 |
| 2018/0091908 A1* | 3/2018 | Goel | G08G 5/0069 |
| 2018/0096445 A1* | 4/2018 | Eyler | G06Q 10/02 |
| 2018/0107944 A1* | 4/2018 | Lin | G06Q 20/4016 |
| 2018/0109767 A1* | 4/2018 | Li | G01C 21/165 |
| 2018/0111683 A1* | 4/2018 | Di Benedetto | G06Q 30/04 |
| 2018/0137470 A1* | 5/2018 | Donnelly | H04W 4/024 |
| 2018/0139152 A1* | 5/2018 | Shaw | H04W 4/40 |
| 2018/0252533 A1* | 9/2018 | Jantunen | H04W 4/029 |
| 2018/0253092 A1* | 9/2018 | Trapero Esteban | H04W 12/06 |
| 2018/0265194 A1* | 9/2018 | Gauglitz | G06Q 50/16 |
| 2018/0268719 A1* | 9/2018 | Guan | G08G 5/0056 |
| 2018/0270611 A1* | 9/2018 | Jones | G08G 5/0069 |
| 2018/0275654 A1* | 9/2018 | Merz | G08G 5/0086 |
| 2018/0276998 A1* | 9/2018 | Yu | G06F 16/29 |
| 2018/0292214 A1* | 10/2018 | Zhang | G01S 19/14 |
| 2018/0300679 A1* | 10/2018 | Mahmood | H04L 67/10 |
| 2018/0329020 A1* | 11/2018 | Hafizovic | G06K 9/00771 |
| 2019/0197430 A1* | 6/2019 | Arditi | G01C 21/3438 |

OTHER PUBLICATIONS

Schenkelberg, F. (2016). How reliable does a delivery drone have to be? 2016 Annual Reliability and Maintainability Symposium (RAMS), pp. 1-5.

Doskocz, J., Kardasz, P., Hejduk, M. et al. (2016). The possibilities of using drones in the courier services. World Scientific News, 48, pp. 119-132.

* cited by examiner

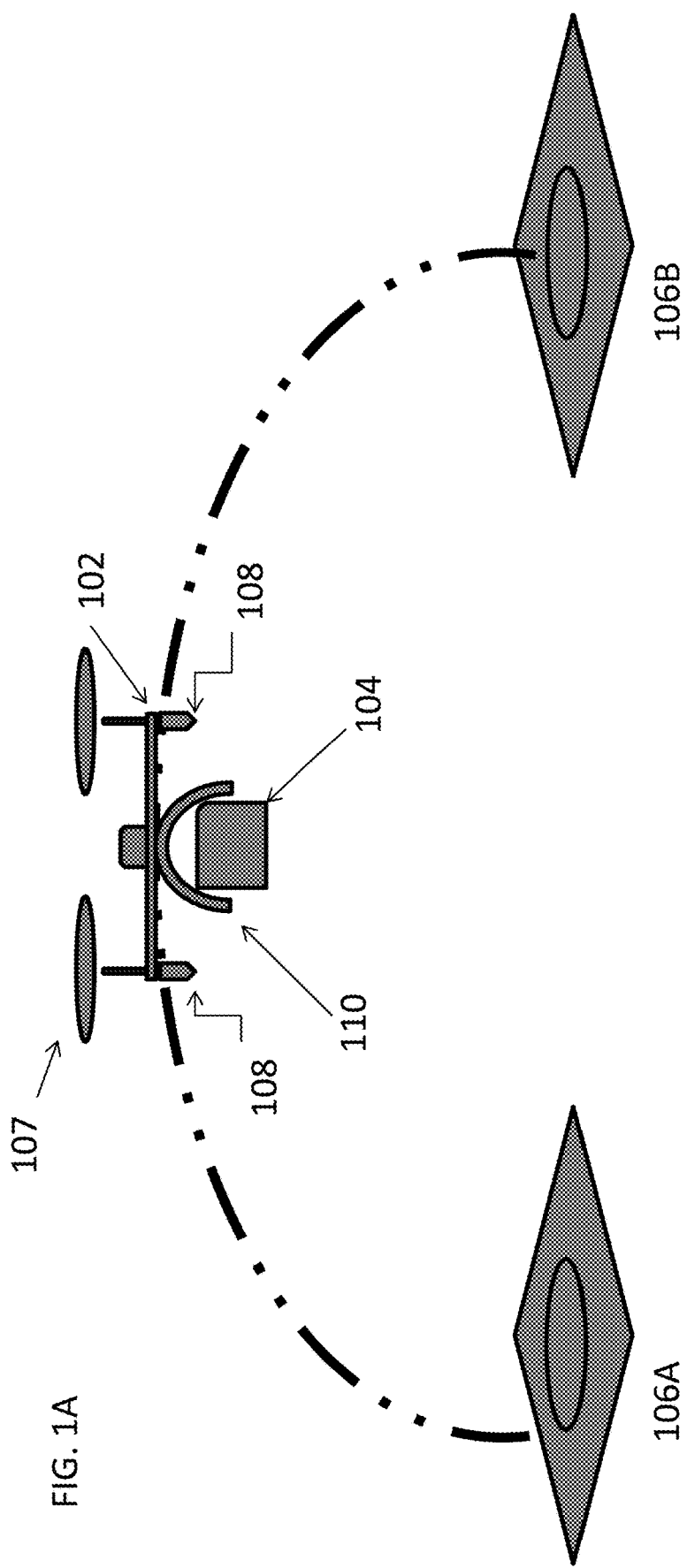

SYSTEM AND METHOD OF SECURELY SENDING AND RECEIVING PACKAGES VIA DRONES

BACKGROUND OF THE INVENTION

Autonomous vehicles are increasingly present in various commercial roles. For example, drones are being evaluated by various governmental bodies for suitability as delivery devices. Merchants seeking to ship goods to customers may use such delivery drones to engage in direct to consumer shipping. Such delivery may ease congestion of roadways and improve accuracy with regards to delivery times.

However, drone shipping as a preferred or typical shipping method carries with it inherent drawbacks. Autonomous systems often lack robust knowledge about either the packages they are tasked with delivering or the identity of the intended recipient. As such, accurate identification of shippers and receivers becomes far more important when drone systems are used. Potential errors in package delivery or the content of the delivery may arise when a shipper or receiver is not properly authenticated prior to engaging in a drone-based delivery transaction. Additionally, using autonomous delivery systems presents the added difficulty of not having a discrete and identifiable record of human interactions so as to pinpoint where and when discrepancies and errors were introduced into the delivery workflow.

SUMMARY

Thus, what are needed are systems, methods and apparatus that enable an autonomous vehicle to verify or authenticate a shipper intending to ship a package. What is also needed is an autonomous vehicle that authenticates or verifies an intended recipient of a shipped package prior to releasing the packing into the recipient's possession. In order to provide a system for autonomously sending and receiving goods accurately and quickly the following is provided:

A system comprising a mobile vehicle frame have a package receptacle configured to secure one or more packages to the mobile vehicle frame and equipped with an engageable access device. The mobile vehicle frame having one or more processors configured by code to: access an authorized shipper profile and an authorized receiver profile from a database, wherein the shipper and receiver profiles include respective location data and identification data. The mobile vehicle is configured by code to navigate, using the location data, the shipping location and receive authentication data from a shipper. The mobile vehicle authenticates the shipper by comparing the shipper authentication data with the shipper identification data. The mobile vehicle is additionally configured by code to permit access to the package receptacle upon a match of the shipper identification data and shipper authentication data by disengaging the access device of the package receptacle. The mobile vehicle is configured by code to navigate, using the location data, to the recipient location and authenticate the recipient by comparing the recipient authentication data with the recipient identification data. The mobile vehicle is further configured by code to permit access to the package receptacle upon a match of recipient identification data and recipient authentication data by disengaging the access device of the package receptacle.

In a further implementation, an autonomous vehicle is proposed comprising a transport body configured to travel to an identified location, a package retention device for securing one or more packages to the transport body; one or more processors integral to the transport body, wherein the processors are configured by code executing therein to: access shipper and recipient profile data; wherein the shipper and recipient profile data includes location data for shipper and recipient; navigate the autonomous vehicle to a shipping destination and a delivery destination; provide access to the package retention device upon authentication of a shipper presenting a package at a shipping destination, and provide access to the package retention device upon authentication of a recipient retrieving a package at the delivery destination.

In a further implementation, a method for authenticating shippers and recipients of packages using an autonomous package delivery device equipped with a package securing device and one or more processors is provided. The method includes the step of obtaining an authorized shipper profile, wherein the authorized shipper profile includes at least a shipper photo of a shipper, a shipper location and personal identification data associated therewith. In a further step, an authorized recipient profile is obtained, wherein the authorized recipient profile includes at least a recipient photo of a recipient, a recipient location and personal identification data associated therewith. Furthermore, a step of navigating the autonomous package delivery device using the shipper location data to the shipping location is provided. In one implementation, a further step includes accessing, from one or more image devices, an image of one or more individuals present at the shipping location and authenticating the shipper by comparing the images to photos of authorized individual using one or more facial recognition modules configured as code executing in the processor. A successful comparison permits access by the shipper to the package securing device. Additionally, the autonomous package delivery device is navigated to the receiving location using the receiver location data. A further step is directed to obtaining an image of one or more individuals present at the receiving location and authenticating the receiver by comparing, using one or more facial recognition modules configured as code executing in the processor, the receiver photo and the image of the one or more identified individuals to determine an identity match. Access to the package securing device is permitted upon authentication of the recipient.

BRIEF DESCRIPTION OF THE DRAWINGS

The present invention can be more fully understood by the following detailed description of the preferred embodiments, with reference made to the accompanying drawings wherein:

FIG. 1A illustrates an arrangement of elements in accordance with one aspect of the present disclosure showing shipment from a shipper to a recipient;

DETAILED DESCRIPTION

Figure 1B:
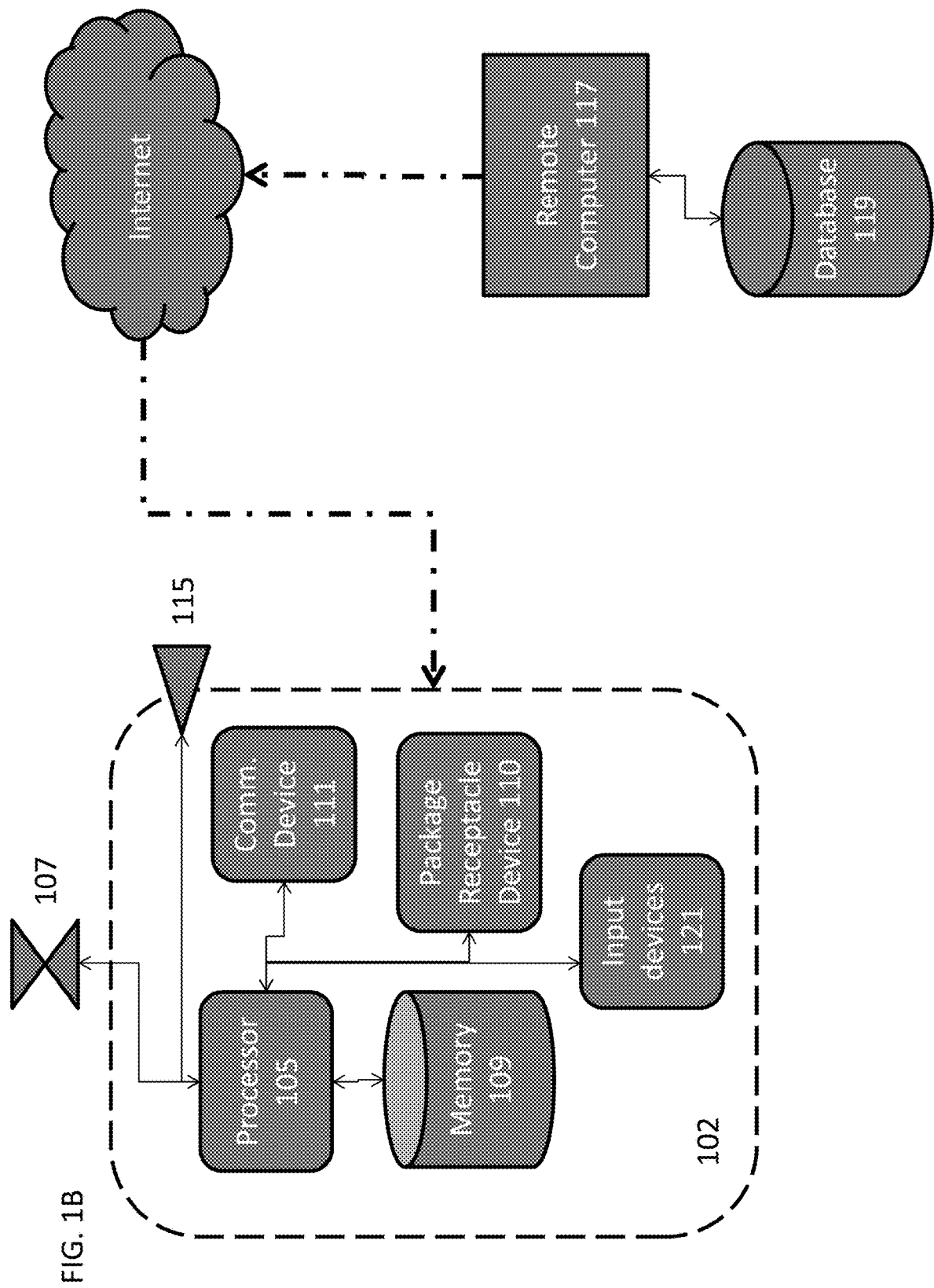
FIG. 1B is a block diagram of specific elements of an arrangement for controlling the arrangement of FIG. 1 in accordance with one aspect of the present disclosure.

By way of overview and introduction, the present invention is directed to systems, methods and apparatus for delivering packages via an autonomous vehicle or platform. Specifically, an autonomous vehicle authenticates a shipper prior to receiving and transporting a package to an intended recipient. The autonomous vehicle authenticates the recipient of the package prior to releasing the package to the recipient to insure accurate delivery.

As used herein, the term drone, unmanned or autonomous vehicle refers to any autonomous or semi-autonomous vehicle that is capable of performing some functions without a physically-present human pilot or operator. An unmanned vehicle may take numerous forms, including aircraft (such as various forms of rotorcraft, fixed-wing aircraft, jet aircraft, ducted fan aircraft, lighter-than-air dirigible such as a blimp or steerable balloon, tail-sitter aircraft, glider aircraft, and/or ornithopter), among other possibilities. In an alternative implementation, the unmanned vehicle may take the form of one or more ground transport vehicles, such as unmanned automobiles, delivery platforms and tracked or wheeled vehicles. In a further implementation, the unmanned vehicle refers to an unmanned marine vehicle. Further, the terms "drone", "unmanned vehicle system" ("UVS"), or "unmanned aerial system" ("UAS") may also be used to refer to an autonomous vehicle.

With particular reference to FIG. 1A, a drone 102 which may refer to one or more unmanned aerial vehicles capable of one or more flight-related functions, may be configured though one or more processors configured by local or remote code, to sense the environment and operate through airspace without the need for input from an operator. Alternatively, the drone 102 may be controlled, in part, by a remote human operator(s) while other functions are carried out autonomously. Further, the drone 102 may be configured to allow a remote operator to take over functions that can otherwise be controlled autonomously by the drone 120. In one or more implementations, a given type of function of the drone 102 may be controlled remotely at one level of abstraction and performed autonomously at another level of abstraction. For example, a remote operator or system may provide destination data or general navigational details, while the drone 102 implements specific actions to negotiate the environment and arrive at the identified or provided destination.

In a particular implementation, the drone is of suitable size, dimensions and performance characteristics to transport a load, such as a package 104. For example, a package is secured to the drone by a package receptacle device 110.

In a particular implementation, the drone 102 is programmed to follow a predetermined path or route using waypoints (e.g., latitude, longitude, elevation markers) that the drone 102 follows and return back to its origination location. Automatic object detection and avoidance may be used when drone 102 is in an autonomous mode. A semi-autonomous drone 102 may be programmed to navigate to a specific spot such as location 106A and then wait for further instructions. Manual control may include a user operating a remote control device to control the drone 102. In a particular implementation, the drone 102 may utilize the navigation data obtained from one or more sensors 108 located on the drone (e.g. camera 115 in FIG. 1B),— autonomously or otherwise—to particular navigational points, such as to point 106B. The navigation data may include data representing a geographic area including roads and their associated positioning coordinates (e.g., GPS or GLONASS). The navigation data may include altitude data of the geographic area. The data may also include location data on man-made objects.

With particular reference to FIG. 1B, the drone 102 includes one or more processors or computers 105 used to manipulate drives, controls, sensors, flight surfaces, engines, motors (107), or other devices in direct or remote communication with the processors. For example, the processor or computer 105 refers to any and all electronic devices executing a commercially available or custom operating system, e.g., MICROSOFT WINDOWS, APPLE OSX, UNIX or Linux based operating system implementations. In other embodiments, the processor 105 comprises, or includes, custom or non-standard hardware, firmware or software configurations. For instance, the processor may comprise one or more servers, cloud computing elements, distributed computing elements, collections of micro-computing elements, computer-on-chip devices, home entertainment consoles, media players, set-top boxes, prototyping devices or "hobby" computing elements. The processor can comprise a single processor, multiple discrete processors, a multi-core processor, multiple multi-core processors or other types of processor(s) known to those of skill in the art, depending on the particular embodiment.

In a further implementation, the processor or computer 105 may be a collection of discrete computing or electronic elements that when combined form a microprocessor or microcontroller configured to control various peripheral devices, such as motor 107, camera 115 and package receptacle devices 110. Such a microcontroller can include a digital signal processor (DSP), microprocessor, programmable logic device (PLD), gate array, or a plurality of processing components as well as power management subsystems integrated into a single integrated circuit. As used herein, the term "integrated circuit (IC)" refers to any type of device having any level of integration (including without limitation ULSI, VLSI, and LSI) and irrespective of process or base materials (including, without limitation Si, SiGe, CMOS and GaAs). The microcontroller may also comprise an internal cache memory 109 that is configured to store computer readable instructions for execution fetched from the memory sub-system.

In a particular implementation, the memory 109 of the processor 105 comprises one or more non-transitory computer media, including but not limited to SRAM, Flash, SDRAM, and/or Hard Disk Drive (HDD) components. The memory sub-system is configured to store computer readable instructions (code) for execution by the processor, such as in the form of the modules provided in FIG. 3.

With continued reference to FIG. 1B, one or more communication modules or interfaces 111 are used by the one or more of the processors 105 of the drone to communicate with one or more remote servers or computers 117, either directly or through a network, such as the Internet. In one implementation, the drone includes one or more receivers, transmitters, or transceivers for initiating, exchanging and receiving data utilizing a variety of network types and protocols. In a further implementation, the drone 102 is equipped to communicate with one or more remote servers or computers 117 using local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. A network may include a single local area network (LAN) or wide-area network (WAN), or combinations of LAN's or WAN's, such as the Internet. Naturally, to the extent the drone is mobile or is moving during communication, a wireless communication channel is preferred.

The processor or computer 105 is configured by code to receive data from one or more sensors 108 (e.g. camera 115) integral to the drone 102. Such sensors may also include temperature sensors, pressure sensors, GPS transceivers, LIDAR scanners, ultrasonic rangefinders, electro-optical sensors, infrared sensors, depth cameras, camera arrays, microphone arrays, gyroscopes, accelerometers, proximity sensors, microphones, and magnetometers.

In a particular configuration, the one or more processors 105 of the drone 102 are configured to control a package receptacle device 110. Here, the package receptacle device 110 secures one or more packages 104 to the drone 102 during transit. For example, the package receptacle 110 is an enclosure integral to the drone 102 where a package 104 may be secured. Alternatively, the package receptacle 110 is one or more retention devices, such as processor controlled grips, straps, cables, chord, or other devices, that secure a package 104 to the drone.

In a further arrangement, the package receptacle device 110 is equipped with a locking mechanism to provide or prevent access to the package. Here, a package receptacle device 110 is equipped with a door or hatch that permits access to the storage enclosure or receptacle. The door or hatch is equipped with a locking device activated or deactivated in response to a signal from one or more of the processors 105. Alternatively, the locking device is configured to communicate though one or more transmitter or receiver devices with a control computer or server 117 remote to the drone.

The drone 102 so described receives shipper and recipient data. The received data is used to navigate to the shipper at 106A, acquire package(s) from the shipper, and deliver them to the recipient at 106B.

Figure 4:
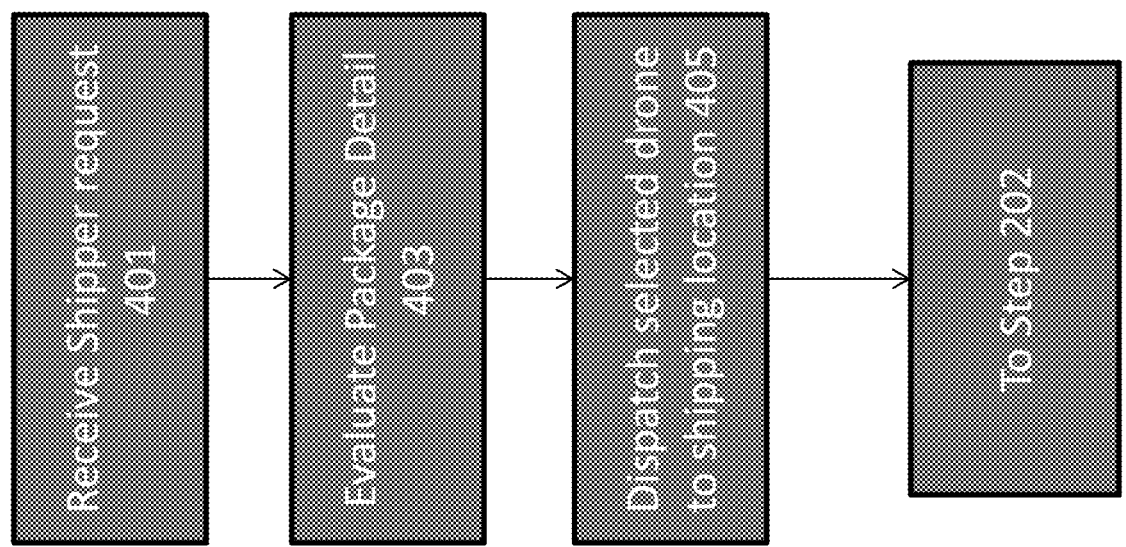
FIG. 4 is a flow diagram indicating various steps according to a further embodiment the present disclosure.

With a brief elaboration provided in FIG. 4, the drone 102 is dispatched from a drone broker, shipping supplier or staging facility to the shipper to acquire the package. For example, where a merchant desires to send goods to a customer via drone shipping, the shipper contacts a drone broker or supplier as in step 401. Here, the shipper request includes details regarding the package to be shipped (e.g. weight, dimensions, fragility) and the intended recipient location. Upon receipt of the shipper request, the broker evaluates an inventory of drones and selects a drone for shipment that meets the criteria of the request as in step 403. For instance, one or more computers, such as remote computer 117 is configured to receive the shipper data and evaluate the inventory of available drones for capabilities (e.g. lifting capacity, range etc.) suitable for delivering the packages. Once selected, the appropriate drone is dispatched by the remote computer 117 to the shipper's location or a location identified by the shipper for acquisition of the package, as in step 405.

Figure 2:
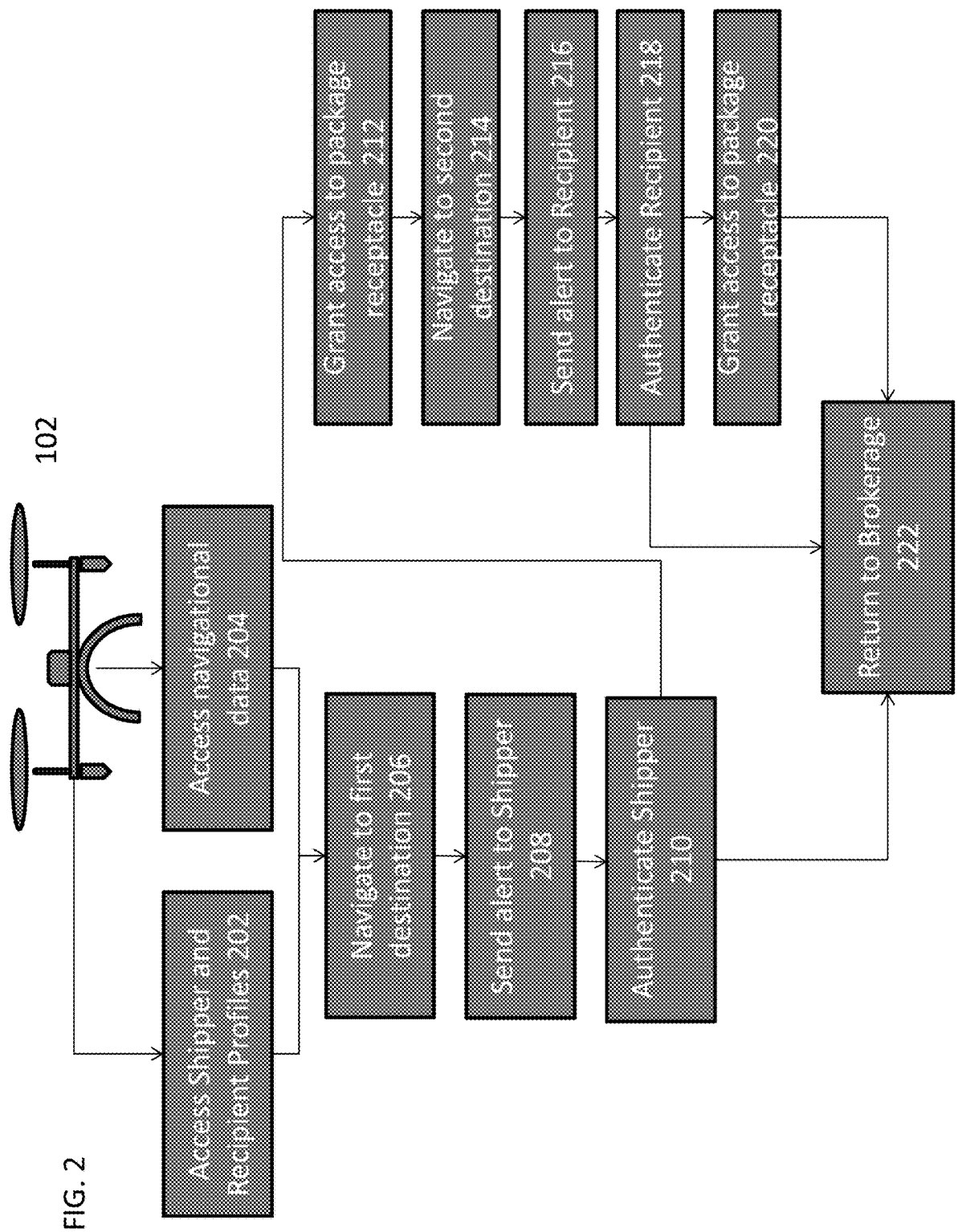
FIG. 2 is a flow diagram indicating various steps in the shipping operation according to one embodiment the present disclosure.
Figure 3:
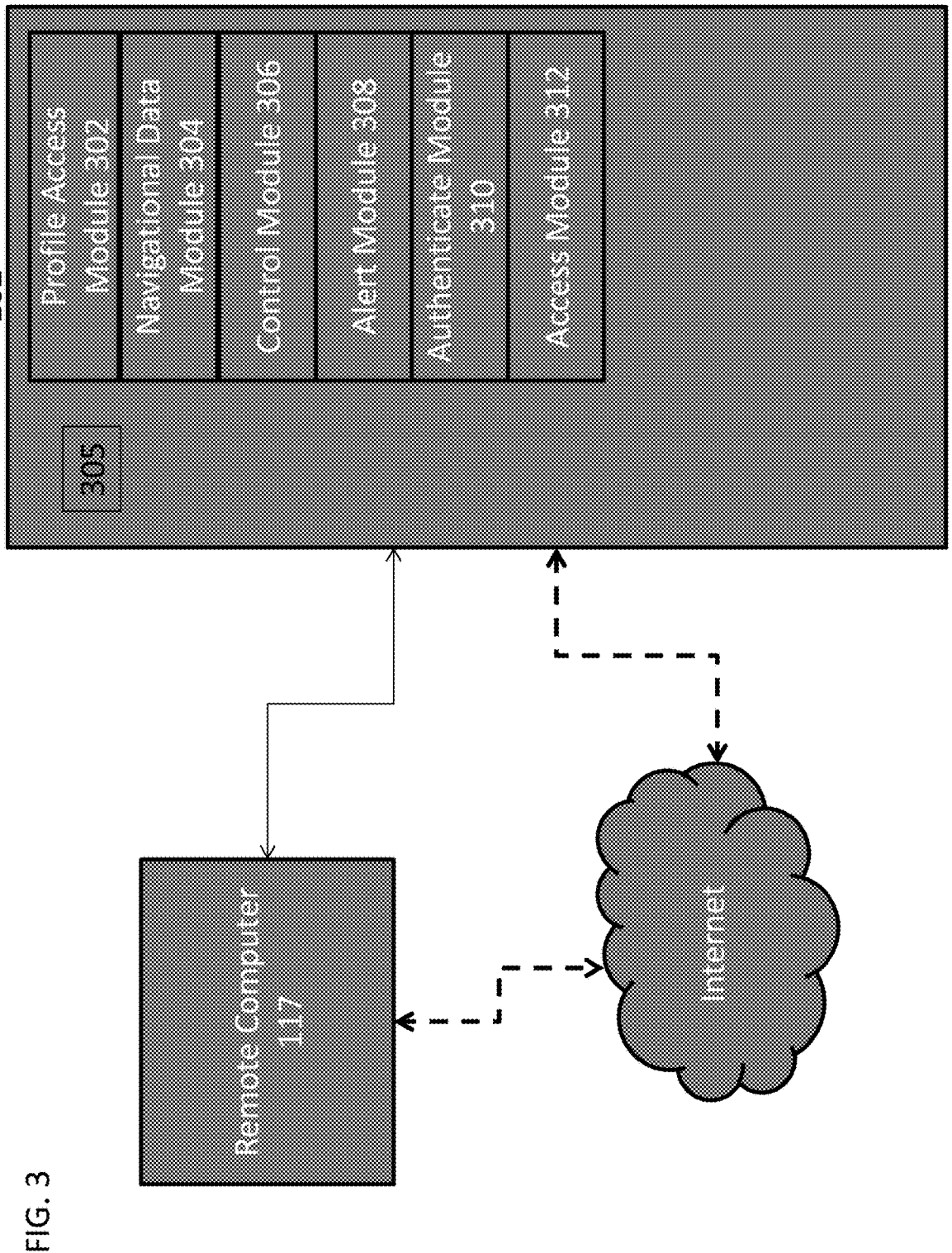
FIG. 3 is a block diagram of modules used in connection with one or more elements of the present disclosure.

Turning to FIGS. 2 and 3, as shown in step 202, the drone receives or accesses data relating to a shipper, a package recipient or both before, during or after transit to the shipper location. In a particular implementation, the step 202 is carried out by one or more processors 305 of the drone 102 configured with a profile access module 302. In an alternative implementation, the step 202 is carried out by one or more computers or servers 117 remote to the drone, but configured to transmit data to the drone 102.

In one particular arrangement, prior to the dispatching of a drone, the shipper and recipient enter into a commercial or other transaction to ship goods (e.g. packages 104). In one implementation, the shipper and recipient enter into this transaction using one or more commerce platforms. By using such a commerce platform, both the shipper and recipient provide profile data that is stored in a database 119 (See FIG. 1B) and is accessible directly or remotely by the one or more processors 305 of the drone 102 or the remote computer 117. Here, database(s) 119 may store a set profile data, as well as rules that govern how the drone 102 is to operate for a given set of conditions.

The profile data relating to the shipper or recipient may be in the form of a unique identification number, customer account, transaction number or other numerical or data identifier. In a further implementation, the data relating to the shipper or recipient includes a digital photo of one or more persons considered to be an agent of the shipper as well as a matching personal identification number associated with the photo. Likewise, the profile data related to the recipient includes one or more digital photos that depict one or more persons suitably authorized to receive or accept a package for a given account at a particular location. The data relating to the package shipper or recipient may further include one or more biometric datasets that correspond to particular features of the one or more persons authorized to send or receive packages using the system described.

In a further implementation, the drone is configured to obtain navigational waypoints for a shipping location and a receiving location as in step 204. Returning to FIG. 1A, a drone is configured to receive navigational way points to navigate from the drone broker or staging area (not shown) to a first destination 106A. Here 106A represents the shipper destination. The drone 102 also receives navigational data to navigate from first destination 106A to second destination 106B, where 106B represents the intended recipient location. As shown in FIG. 3, the step of receiving navigational data may be carried out by a processor (such as processor 305) configured with a navigational data module 304. In one particular implementation one or more processors of the drone 102 are configured by the navigational data module 304 to receive navigational data from a remote service or server 117. For example, the one or more processors of the drone 102 are configured through the navigational data module 304 to communicate with a server or computer 117 that holds account data for the shipper and or recipient. Here, a pre-set collection of navigational data points are provided to the drone for use in navigating to the first and second destinations.

In a further configuration, the navigational data module 304 configures the one or more processors 305 of the drone 102 to receive only coordinate data for each of the first and second destination points. One or more submodules of the navigational data module 304 configures the one or more processors of the drone to generate or calculate, such as through the use of various mapping and navigational resources, the necessary navigational waypoints to autonomously navigate from the present location (such as the drone broker location) to the first and second destinations. In yet a further implementation, navigational data module 304 configures one or more processors of the drone 102 to generate, from location data (such as coordinates derived or obtained from one or more GPS devices), suitable navigational waypoints to enable the drone to navigate from a present location to the first and second destinations.

With continued reference to FIGS. 2 and 3, the drone 102, equipped with the navigational data supplied by the navigational data module 304, navigates to the first destination, as in step 206. In one particular implementation, the one or more processors of the drone are configured by a control module 306. The control module configures the one or more processors of the drone to send control signals to one or more actuators, motors (107), sensors, and/or control surfaces to navigate the drone to the first destination (such as destination 106A of FIG. 1). For example, the control module 306 configures the processor to exchange control data to one or more electric motors (107), driving wheels, propellers, turbines or impellers that cause the drone to traverse a given area using navigational way points. In a further implementation the control module 306 includes path finding or seeking submodules that cause the drone to follow a pre-set navigational path, avoid obstacles, and identify navigational landmarks.

Upon reaching the first destination, the drone 102 alerts the shipper that it has arrived at the shipping destination as in step 208. In one particular implementation the drone sends an alert through a network to an electronic address or mailbox of the shipper. For example, one or more processors 305 of the drone are configured by an alert module 308 to generate or identify an alert and cause the generated alert to be sent to the shipper using data from the shipper profile.

The alert module 308 is comprised of one or more submodules that configure the one or more processors to generate the alert, such as by providing a short text message referencing the make, model, color or other identifying characteristic of the drone. In a further implementation, the alert generated is an audio alert emitted by the drone. In yet a further implementation, the drone is configured by the alert module 308 to send one or more alerts to a number of different accounts, each registered or associated with the authorized shipper The drone 102 stays at the shipping destination until the shipper presents authorization credentials to the drone for authentication. In step 210, the drone authenticates the shipper by reviewing or comparing authorization credentials presented by the shipper to a stored value or profile. For example, one or more processors of the drone are configured by an authentication module 310 to authenticate the shipper using one or more data sets obtained from the shipper profile. By way of non-limiting example, the drone 102 is configured by the authentication module 310 to compare a stored image of the one or more authorized shippers with facial recognition data of a shipper present at the first destination. Here, one or more biometric identifiers or markers are extracted from the stored profile image and compared to biomarker identifiers extracted or obtained from an image taken of one or more persons present at the shipping location. Where individual presenting a package to the drone 102 is identified as the individual from the profile, an authorization value is generated. In a further implementation, the shipper is prompted by the drone to provide a code (such as a Personal Identification Code or PIN code) in addition to the biometric authentication. In one arrangement, the PIN is provided by a touch screen or input device 121 provided by the drone. In an alternative arrangement input device 121 is a microphone and the code is provided by speaking the PIN to the drone. Here, the spoken code is recorded by one or more microphones and sent to one or more voice recognition submodules of the authentication module 310. The voice recognition submodule configures the local processor 305 or a remote computer 117 to parse the audio data and compare the extracted values to the stored PIN values. Where the values match, the authorization value is generated.

In a particular implementation, a submodule of the authentication module 310 configures one or more processors of the drone to extract biometric identifiers from a stored image. An additional submodule configures one or more processors to obtain an image of one or more persons utilizing one or more cameras 115 integral to the drone. In an alternative implementation, the authentication module 310 configures the one or more processors of the drone to access one or more remote camera or video feeds that capture the one or more individuals in close proximity to the drone waiting at the first destination. Here, the one or more processors of the drone are configured to compare the biometric data obtained from the remote cameras and compare it to data obtained from the shipper profile.

In still a further implementation, the authorization module 310 transmits the image data corresponding to the one or more shippers and transmits the information to one or more remote servers or computers for analysis, such as facial recognition analysis. Here, the authorization module 310 receives the authorization value or indicator representative that the shipper has been authorized from the remote server or computer 117.

As a means for safeguarding the drone, it can be configured by one or more submodules of the authentication module 310 to hover above the shipping location (106A) until successfully authenticating the shipper. For instance, the drone is configured to hover outside of normal reach for persons in the general vicinity of the delivery location, but within range of one or more authentication devices.

Using the authorization value, access is granted to the package receptacle as in step 212. In one implementation, one or more processors of the drone are configured by an access module 312 to unlock the shipping receptacle. Here, the locking mechanism is in communication with the one or more processors of the drone. Upon receipt of the authorization value, the locking mechanism is disengaged and access is permitted so as to secure the package. Once unlocked, the shipper is free to insert or secure a package in or to the shipping receptacle 110. Alternatively, the access module 312 configures the one or more processors of the drone to permit the shipper to secure a package to drone.

Using the navigational data corresponding to the recipient location, the drone navigates with the package, to the recipient as in step 214. For instance, the one or more processors of the drone 102 are configured by the control module 306 to direct the drone to autonomously travel from the first to the second destination. In a further implementation, the drone is configured by the control module 306 and navigational data module 304 to identify particular waypoints where the drone may re-charge or refuel prior to traveling to the recipient location.

Upon reaching the second destination, the drone 102 alerts the intended recipient that the package has arrived at the recipient destination as in step 216. In one particular implementation the drone sends an alert through a network to an electronic address or mailbox of the intended recipient. For example, one or more processors of the drone are configured by the alert module 208 to generate or identify a communication option from the recipient profile and cause an alert to be sent to the intended recipient.

The drone stays at the recipient destination until the intended recipient presents authorization credentials to the drone for authentication.

In order to protect the drone and the package, the drone may hover at the recipient destination at an elevation low enough for authentication, but high enough to prevent the drone and the package from being seized by unauthorized persons.

In step 218, the drone authenticates the recipient by reviewing or comparing authorization credentials presented by the recipient to a stored value or profile. For example, one or more processors of the drone are configured by an authentication module 310 to authenticate the intended recipient using one or more items of data (such as a profile picture) obtained from the intended recipient profile and comparing those to credentials supplied by the intended recipient. For example, the drone is configured to obtain an image of the individuals in front of the drone and compare, using facial recognition submodules of the authentication module 310, the image of the intended recipient from the intended recipient profile.

In a further implementation, the drone requests that the intended recipient enter or provide a Personal Identification Number (PIN). Here, the PIN number may be supplied by the intended recipient though the use of a linked electronic device (such as an app executing on a smartphone) or by inputting the PIN directly using a keypad, or touch screen provided by the drone 102. Naturally, if the drone is hovering during authentication, the PIN many be input using a smartphone as a remote connection or by voice identification.

Where a match is identified between the data provided by the recipient and the stored profile of the recipient, one or more processors are configured by an authorization submodule of the authentication module 310 to generate an authorization value.

Using the authorization value, access is granted to the package receptacle 110 as in step 220. In one implementation, one or more processors of the drone 102 are configured by the access module 312 to unlock the shipping receptacle such as subsequent to landing the hovering drone.

Once the package has been removed from the package receptacle or otherwise disengaged from the drone, the drone navigates back to the brokerage.

In an alternative arrangement, where the intended recipient can not be authenticated, the drone returns to the brokerage area as in step 222. Alternatively, where the intended recipient can not be authenticated, one or more processors of the drone are configured by the profile access module 302 to re-access the shipper and recipient data. For example, one or more processors of the drone are used to verify a local copy of the profile data against a persistent copy of the profile data stored in a remote computer or server 117. More specifically, the profile access module 302 configures one or more processors of the drone to compare the profile data used to authenticate the recipient against a new or more recently accessed recipient profile stored remotely. Where there is a discrepancy between the data of the locally stored profile and the remote profile, the remote profile is used to update the local copy of the profile. For instance, the profile access module updates the local copy of the recipient profile when there is disagreement between the recipient profiles with a more recent version.

Alternatively, where the recipient can not be identified, the drone waits at the delivery location for a pre-determined period of time prior to traveling back to the brokerage area. As a further alternative, the drone may contact the shipper to determine if the package should be returned or sent to an alternative recipient.

Notably, the figures and examples above are not meant to limit the scope of the present application to a single implementation, as other implementations are possible by way of interchange of some or all of the described or illustrated elements. Moreover, where certain elements of the present application can be partially or fully implemented using known components, only those portions of such known components that are necessary for an understanding of the present application are described, and detailed descriptions of other portions of such known components are omitted so as not to obscure the application. In the present specification, an implementation showing a singular component should not necessarily be limited to other implementations including a plurality of the same components, and vice-versa, unless explicitly stated otherwise herein. Moreover, applicants do not intend for any term in the specification or claims to be ascribed an uncommon or special meaning unless explicitly set forth as such. Further, the present application encompasses present and future known equivalents to the known components referred to herein by way of illustration.

The foregoing description of the specific implementations will so fully reveal the general nature of the application that others can, by applying knowledge within the skill of the relevant art(s) (including the contents of the documents cited and incorporated by reference herein), readily modify and/or adapt for various applications such specific implementations, without undue experimentation, without departing from the general concept of the present application. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various implementations of the present application have been described above, it should be understood that they have been presented by way of example, and not limitation. It would be apparent to one skilled in the relevant art(s) that various changes in form and detail could be made therein without departing from the spirit and scope of the application. Thus, the present application should not be limited by any of the above-described example implementations.

Furthermore, it is recognized that terms may have nuanced meanings that are suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter can be based upon combinations of individual example embodiments, or combinations of parts of individual example embodiments. While this specification contains many specific embodiment details, these should not be construed as limitations on the scope of any embodiment or of what can be claimed, but rather as descriptions of features that can be specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Publications and references to known registered marks representing various systems are cited throughout this application, the disclosures of which are incorporated herein by reference. Citation of any above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the points that follow, the respective features recited in those points, and by equivalents of such features.

What is claimed:

1. A system comprising:
   a mobile vehicle frame having a package receptacle configured to secure one or more packages to the mobile vehicle frame and equipped with an engageable access device,
   the mobile vehicle frame having one or more processors configured by code to:
   access an authorized shipper profile and authorized recipient profile from a database, wherein the authorized shipper and recipient profiles include respective location data and identification data;
   navigate, using the location data, the mobile vehicle frame to a shipping location, corresponding to a shipper, indicated in the authorized shipper profile;
   generate a shipper location alert indicating that the mobile vehicle frame is present at the shipping location, wherein the generated shipper location alert is an audio alert that includes information describing identifying characteristics of the mobile vehicle frame, wherein the identifying characteristics include one or more characteristic selected from the group consisting of a make, a model, and a color;
   emit the shipper location alert as an audio alert, indicating the identifying characteristics of the mobile vehicle frame, from the mobile vehicle frame, while the mobile vehicle frame is present at the shipping location;
   receive authentication data from the shipper;
   authenticate the shipper, while maintaining a hovering elevation above the shipping location, by comparing the authentication data of the shipper with the identification data of the shipper included in the authorized shipper profile, wherein the hovering elevation is outside a reaching distance of one or more individuals present at the shipping location;
   in response to authenticating a match of the identification data and the authentication data of the shipper, permit access to the package receptacle by:
   sending one or more authorization values to an electronic lock device integral to the engageable access device;
   navigating the mobile vehicle frame from the hovering elevation to a landing position for the shipper; and
   disengaging a locking mechanism of the engageable access device.

2. The system of claim 1, wherein the one or more processors are further configured to:
   navigate, using the location data, the mobile vehicle frame to a shipping location, corresponding to a recipient, indicated in the authorized recipient profile;
   authenticate the recipient by comparing recipient authentication data with recipient identification data; and
   in response to authenticating a match of recipient identification data and recipient authentication data, permit access to the package receptacle by disengaging the locking mechanism of the engageable access device.

3. The system of claim 1, wherein authenticating the shipper further comprises:
   receiving the authentication data from the shipper as audio data recorded utilizing a microphone, the audio data including a personal identification number (PIN);
   parsing the audio data to extract values of the PIN from the audio data; and
   authenticating the shipper by comparing the extracted PIN values of the audio data to a stored set of PIN values corresponding to the shipper.

4. The system of claim 1 wherein the authorized shipper profile includes a shipper image depicting the shipper and a shipper personal identification number associated with the shipper image; and wherein the authorized recipient profile includes a recipient image depicting a recipient and a recipient personal identification number associated with the recipient image.

5. The system of claim 4 wherein the mobile vehicle frame further includes at least one biometric data acquisition device.

6. The system of claim 4 wherein the one or more processors are further configured to:
   authenticate the shipper by capturing at least one image of the shipper at the shipping location corresponding to the shipper;
   extracting one or more biometric data points from the captured image;
   extracting one or more biometric data points from the shipper image; and
   comparing the one or more biometric data points.

7. The system of claim 6 wherein the one or more processors are further configured to:
   prompt the shipper to input a shipper personal identification number on an input device coupled to the mobile vehicle frame;
   receive input data from the input device; and
   compare the input data to the shipper personal identification number.

8. The system of claim 4 wherein the one or more processors are further configured to:
   navigate, using the location data, the mobile vehicle frame to a storage location upon failure to authenticate.

9. A method for authenticating shippers and recipients of packages using an autonomous package delivery device equipped with a package securing device and one or more processors, the method comprising the steps of:

obtaining an authorized shipper profile, wherein the authorized shipper profile includes at least a shipper image of a shipper, a shipper location and personal identification data associated therewith and an authorized recipient profile, wherein the authorized recipient profile includes at least a recipient image of a recipient, a recipient location and a personal identification data associated therewith;

navigating the autonomous package delivery device using the shipper location to a shipping location;

generating a shipper location alert indicating that the autonomous package delivery device is present at the shipping location, wherein the generated shipper location alert is an audio alert that includes information describing identifying characteristics of the autonomous package delivery device, wherein the identifying characteristics include one or more characteristic selected from the group consisting of a make, a model, and a color;

emitting the shipper location alert as an audio alert, indicating the identifying characteristics of the mobile vehicle frame, from the mobile vehicle frame, while the mobile vehicle frame is present at the shipping location;

accessing, from one or more image devices, an image of one or more individuals present at the shipping location;

authenticating the shipper, while maintaining a hovering elevation above the shipping location, by comparing, using one or more facial recognition modules configured as code executed in the one or more processors, the shipper image and the image of the one or more individuals present at the shipping location, wherein the hovering elevation is outside a reaching distance of the one or more individuals present at the shipping location;

in response to authenticating the shipper, permitting access, at the shipping location, to the package securing device by:
  sending one or more authorization values to an electronic lock device integral to the package securing device;
  navigating the autonomous package delivery device from the hovering elevation to a landing position for the shipper; and
  activating the electronic lock device to allow access to the package securing device.

10. The method of claim 9, wherein authenticating the shipper further comprises:
  prompting the shipper to input a personal identification number into a smartphone of the shipper, wherein the smartphone is in wireless communication with the autonomous package delivery device; and
  wherein the hovering elevation is within a wireless communication range to the autonomous package delivery device.

11. The method of claim 10, further comprising the step of receiving a personal identification from an input device coupled to the autonomous package delivery device.

12. The method of claim 9, wherein the step of accessing, from one or more image devices, an image of one or more individuals present at the shipping location includes acquiring one or more images using an image capture device communicatively coupled to the autonomous package delivery device.

13. The method of claim 9, wherein the step of obtaining the authorized shipper and recipient profiles includes accessing a remote database containing stored profiles for the shipper and recipient.

14. The method of claim 9, further comprising the steps of:
  navigating the autonomous package delivery device to a receiving location using the recipient location;
  obtaining an image of one or more individuals present at the receiving location;
  authenticating the recipient by comparing, using one or more facial recognition modules configured as code executed in the one or more processors, the recipient image and the image of the one or more individuals present at the receiving location to determine an identity match; and
  in response to determining the identity match and authenticating the recipient, permitting access, at the receiving location, to the package securing device.

15. The method of claim 14, wherein authenticating the recipient further comprises:
  maintaining a hovering elevation above the receiving location, wherein the hovering elevation is outside a reaching distance of the one or more individuals present at the receiving location.

16. The method of claim 15, wherein permitting access, at the receiving location, to the package securing device further comprises:
  sending one or more authorization values to the electronic lock device integral to the package securing device;
  navigating the autonomous package delivery device from the hovering elevation to a landing position for the recipient; and
  activating the electronic lock device to allow access to the package securing device.

17. The method of claim 9, wherein authenticating the shipper further comprises:
  receiving the authentication data from the shipper as audio data recorded utilizing a microphone, the audio data including a personal identification number (PIN);
  parsing the audio data to extract values of the PIN from the audio data; and
  authenticating the shipper by comparing the extracted PIN values of the audio data to a stored set of PIN values corresponding to the shipper.

* * * * *